United States Patent [19]
Oba et al.

[11] Patent Number: 4,465,767
[45] Date of Patent: Aug. 14, 1984

[54] OPTICAL INFORMATION RECORDING MEDIUM

[75] Inventors: Hideaki Oba; Masaakira Umehara, both of Yokohama, Japan

[73] Assignee: Ricoh Company, Ltd., Tokyo, Japan

[21] Appl. No.: 424,688

[22] Filed: Sep. 27, 1982

[30] Foreign Application Priority Data

Nov. 27, 1981 [JP] Japan ................................ 56-189235
Nov. 27, 1981 [JP] Japan ................................ 56-189236
Dec. 10, 1981 [JP] Japan ................................ 56-197707
Dec. 10, 1981 [JP] Japan ................................ 56-197708

[51] Int. Cl.$^3$ .............................................. G03C 1/76
[52] U.S. Cl. .................................... 430/271; 430/945;
430/942; 430/296; 430/273; 430/275; 430/276;
430/277; 430/278; 430/279; 430/524; 430/525;
430/526; 346/135.1; 346/76 L
[58] Field of Search ............... 430/945, 942, 296, 273, 430/275, 276, 277, 278, 279, 524, 525, 526, 271; 346/135.1, 76 L

[56] References Cited

U.S. PATENT DOCUMENTS

| | | | |
|---|---|---|---|
| 3,962,513 | 6/1976 | Eames | 430/945 |
| 4,188,214 | 2/1980 | Kido et al. | 430/945 |
| 4,218,689 | 8/1980 | Bloom et al. | 430/945 |
| 4,230,939 | 10/1980 | de Bont et al. | 346/76 L |
| 4,241,355 | 12/1980 | Bloom et al. | 346/135.1 |
| 4,252,677 | 2/1981 | Smith | 430/945 |
| 4,305,081 | 12/1981 | Spong | 430/945 |
| 4,364,986 | 12/1982 | Zwanenburg et al. | 430/945 |
| 4,373,004 | 2/1983 | Asano et al. | 430/495 |

Primary Examiner—Won H. Louie
Attorney, Agent, or Firm—Flynn, Thiel, Boutell & Tanis

[57] ABSTRACT

An optical information recording medium comprising a substrate and a recording layer superimposed on said substrate, said recording layer being comprised of a reflective layer which contains metal particles having a particle diameter of 1500 Å or less and in which said metal particles have been distributed closely and a light absorptive layer containing a coloring matter.

16 Claims, 9 Drawing Figures

OPTICAL INFORMATION RECORDING MEDIUM

BACKGROUND OF THE INVENTION (a) Field of the Invention

The present invention relates to an optical information recording medium, in particular relates to an optical information recording medium suitably used in writing and reading with a high density energy beam such as laser beam wherein the recording layer superimposed on the substrate has been divided into a reflective layer and a coloring matter-containing light absorptive layer.

(b) Description of the Prior Art

A great number of optical information recording mediums for use in writing and reading with a high density energy beam (for instance, laser beam) have been proposed up to the present. As the typical ones there can be enumerated the recording medium prepared by providing the vapor deposition film of metal, semimetal or nonmetal on the substrate and the recording medium prepared by coating silver halide emulsion onto the substrate and heating same to thereby form the reflective layer thereon (Japanese Laid Open Patent Application No. 108995/1980).

As the recording layers (said vapor deposition films or reflective films) for use in laser recording mediums there are known (1) thin metal films with holes melt-formed by radiation of laser beam, (2) composite lustrous vapor deposited films whose reflective index is reduced at some spots by radiation of laser beam, (3) thin films of dyes or other coating agents that can be removed at some spots by radiation of laser beam and (4) dielectric substances in which the refractive index is varied at some spots by radiation of a laser beam and light diffusion is caused when scanned by a reading laser beam.

However, the recording mediums using vapor deposition films of metal, semimetal or nonmetal, which are generally prepared by a vacuum molding method of the batch type rather than the continuous type, are defective in that they are expensive and further it is difficult to attain a uniform quality of them, when they are mass-produced, because a number of batches are used therein. On the other hand, the process of forming the reflective layer by coating silver halide emulsion onto the substrate and heating same is troublesome in the necessity of pre-coating silver halide emulsion onto the substrate, involves the problem of carrying out the heat treatment at a temperature of 300° C. or more, and further the recording medium prepared by this process is defective in that it is difficult to form the reflective layer of a uniform silver density because the silver density gradient is designed to fall from the reflective layer surface toward the substrate when viewed from the relation between the reflective layer and the light absorptive layer, and it is difficult to obtain the light absorptive layer of a uniform quality because the aforesaid tendency is also observed in the light absorptive layer.

SUMMARY OF THE INVENTION

It is an object of the present invention to provide an optical information recording medium which is free from the above mentioned disadvantages and has a recording layer consisting of a reflective layer (namely, a metallic reflective layer) and a coloring matter-containing light absorptive layer divided from each other. It is another object of the present invention to provide an optical information recording medium capable of being recorded and read with a high density energy beam, wherein a recording layer recordable on one side or both sides can be formed through simple manufacturing means.

In other words, the optical information recording medium according to the present invention is characterized by comprising a substrate and a recording layer superimposed thereon, said recording layer being comprised of a reflective layer which contains metal particles and in which said metal particles have been distributed closely and a light absorptive layer containing a coloring matter.

Figure 1:
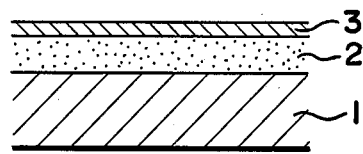
FIG. 1 to FIG. 7 are sectional views illustrating seven embodiments of the typical basic constructions of the recording medium according to the present invention.

Referring to reference numerals affixed to these drawings, 1 denotes a substrate, 2, 2' each denotes a light absorptive layer, 3 denotes a reflective layer (metallic reflective layer), 4 denotes an undercoat, 5 denotes an overcoat, 11 denotes a spacer, 21 denotes a first light absorptive layer, 22 denotes a second light absorptive layer, and 23 denotes the conventional recording layer. The light absorptive layer 2' comprises double layers, namely the first and second light absorptive layers 21 and 22.

DETAILED DESCRIPTION OF THE PREFERRED EMBODIMENTS

As the high density recording processes of image information there are known the processes where recording is attained by causing dot-like changes in the recording medium (more correctly, the recording layer) using a high density energy beam such as laser beam. The recording medium according to the present invention can be used with extreme effect in such recording systems.

The most basic layer constructions of the recording medium according to the present invention are as shown in FIG. 1, FIG. 3, FIG. 5, FIG. 6 and FIG. 7. The recording layer of the recording medium according to the present invention is comprised of the light absorptive layer 2 and the reflective layer 3. And, the recording layer is superimposed on the substrate (support) 1.

The substrate 1 referred to herein includes glass plate, metal plate, heat resisting resin plate and the like. As metals for use in the metal plate there can be enumerated aluminum, stainless steel, copper, iron, yellow copper, gold, silver, platinum, tin (or tin plate), lead, zinc (or sheet zinc) and the like. As resins for use in the heat resisting resin plate there can be enumerated acrylic resin, polycarbonate resin, polysulfone, polyimide, polybenzoimidazole, polyimidazopyrrolone and the like. Among them, polysulfone and polyimide are more preferable because they are free from deformation caused by heat treatment in the preparation of the recording medium.

In this connection, it is to be understood that the substrate 1 may be transparent or not, but in the recording medium of the type where recording is effected by making a high density energy beam such as laser beam or the like penetrate the substrate 1 and radiate the recording layer 2 (or 2') (for instance, the recording mediums as shown in FIG. 3, FIG. 4, FIG. 5 and FIG. 7), it is necessary that the substrate 1 be transparent to the high density energy beam used herein and further be strong enough to withstand said beam.

Figure 2:
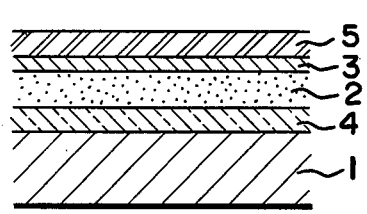

In the recording medium of the type where the light absorptive layer 2 (or 2') contacts with the substrate 1 (in particular, where the substrate 1 is made of a metal plate), it is effective to interpose an undercoat 4 between the substrate 1 and the light absorptive layer 2 (or 2') as illustrated in for instance FIG. 2. The undercoat 4 referred to herein may be transparent or not to a high density energy beam.

Taking thermal conductivity into account, it is possible to form the undercoat 4 using a heat insulating resin material or an inorganic material in a usual manner such as vapor deposition, coating or the like. The resins used herein may include vinyl chloride resin, vinyl acetate resin, acrylic or methacrylic resin, polyester such as polyethylene terephthalate, celluloses such as nitrocellulose and the like, polyamide, polycarbonate, epoxy resin, polyimide, polysulfone and the like, but they are required to be endurable for at least the temperature for drying a recording layer-forming solution. Further, as the inorganic compound used herein there can be enumerated SiO, $SiO_2$, $TiO_2$ and the like. Among them, polyimide and polysulfone are used more preferably. The thickness of the undercoat 4 is in the range of about 0.05–10 μm, preferably about 0.1–0.5 μm.

In the recording medium of the type where the reflective layer 3 is exposed, it is desirable to provide an overcoat 5 as shown in for instance FIG. 2. The overcoat 5 may be formed of either an organic material or an inorganic material provided that it can be penetrated by a high density energy beam, is of a high mechanical strength, does not react with the reflective layer 3 and is of a superior film-forming property. Concrete examples of said organic material are as given in Japanese Laid Open Patent Application Nos. 96716/1974; 59626/1976; 75523/1976; 88024/1976; and 134633/1976. Among them, polystyrene and polyethylene terephthalate are used more profitably. The inorganic material specifically includes $Al_2O_3$, $SiO_2$, SiO, MgO, ZnO, $MgF_2$, $CuF_2$ and the like.

This overcoat 5 may be formed in a usual manner such as vapor deposition, coating or the like, and the suitable thickness thereof is in the range of about 0.1–10 μm, preferably about 0.5–1.0 μm.

Figure 3:
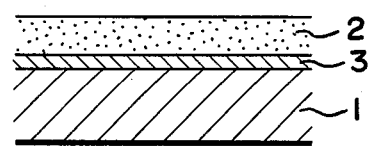
Figure 4:
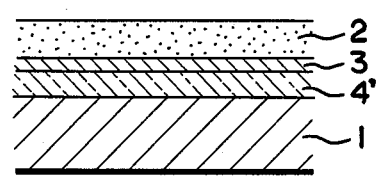
Figure 7:
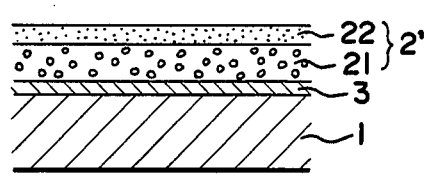
Figure 8:
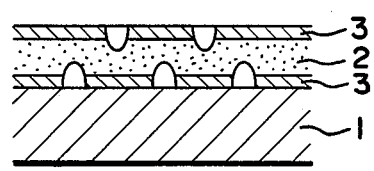
FIG. 8 is a sectional view illustrating the state of having recorded information in the recording medium of FIG. 5.

The recording mediums shown in FIG. 3, FIG. 4 and FIG. 7 are of the type where the light absorptive layer 2, 2' each is exposed and the reflective layer 3 contacts with the substrate 1 directly or through the undercoat 4. Accordingly, in the recording medium of this type, as stated previously, the substrate 1 must be transparent to a high density energy beam (must must be permeated by a high density energy beam).

The undercoat 4' referred to herein is effective in the points of reducing the heat transmission from the recording layer to the substrate 1 to thereby increase the writing sensitivity and further reducing the unevenness of the substrate surface as much as possible. This undercoat 4' illustrated as a typical example in FIG. 4 is exactly the same as the undercoat 4 illustrated in FIG. 2 excepting for the fact that the undercoat 4' illustrated in FIG. 4 must be transparent to a high density energy beam.

Figure 5:
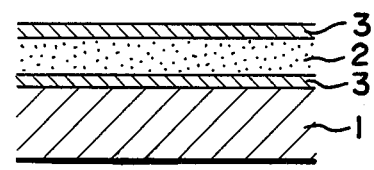
Figure 9:
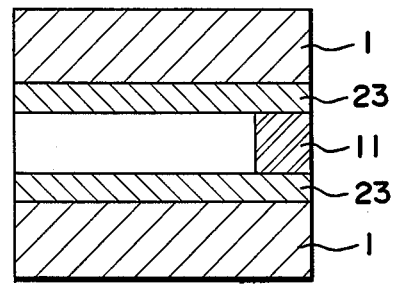
FIG. 9 is a sectional view of the conventional duplex recording medium.

The recording mediums shown in FIGS. 1 to 4, FIG. 6 and FIG. 7 are used for one-sided recording, while the recording medium shown in FIG. 5 is used for double-sided recording. The recording medium shown in FIG. 5 is different from the conventional double-sided recording medium shown in FIG. 9 in that the former is one prepared by forming a mono-recording layer on a sheet of substrate 1 wherein reflective layers 3 and 3 are placed on the surface side (upper layer and the substrate side (lower layer) of said recording layer and a light absorptive layer 2 is interposed between these reflective layers 3 and 3.

As can be seen readily from the above explanation, in the case of the recording medium shown in FIG. 5, needless to say, the substrate 1 must be transparent to a high density energy beam and it is possible, if necessary, to interpose the undercoat 4' as shown in FIG. 4 between the substrate 1 and the reflective layer 3 on the substrate side or to superimpose the overcoat 5 as shown in FIG. 2 on the reflective layer 3 on the surface side.

It is to be noted that the optical information recording mediums (as illustrated in FIG. 1 to FIG. 7) according to the present invention are most characterized by the recording layer comprising the light absorptive layer 2 (or 2') and the reflective layer 3.

In more detail, the reflective layer 3 is in such a state that it contains metal particles having a particle diameter of 1500 Å or less, and said metal particles have been closely, in more concrete plainly distributed so that the percentage of metal particles occupying per unit surface area of the reflective layer may be 60–98%, preferably 70–90%. The "plainly distributed state" referred to herein means that metal particles have been distributed across the surface of the light reflective layer in the right and left transverse directions but not in the longitudinal direction so that they do not lie one upon another. However, this is an ideal. In practice, it will suffice if the metal particles are distributed so as to extend in the transverse directions and to maintain said percentage of occupation per unit surface area as a whole, regardless of whether some metal particles lie one upon another in a direction perpendicular to the surface.

In case the diameter of metal particles in the reflective layer 3 is greater than 1500 Å it comes to hinder reading out and writing operations, while in case the said percentage of metal particles occupying per unit surface area of the reflective layer is less than 60% it deteriorates the writing and reading out characteristics and in case said percentage is greater than 98% it is undesirable because a large energy is required for writing.

As mentioned above, the reflective layer 3 is mostly formed of metal particles, and it includes (i) the one formed of metal particles alone, (ii) the one composed of metal particles and a binder resin, (iii) the one formed of metal particles and a coloring matter, (iv) the one formed of metal particles, a coloring matter and a binder resin, (v) the one formed of metal particles, a binder resin and other substances, (vi) the one formed of metal particles, a coloring matter, a binder resin and other substances, and the like. In any case, it is preferable that the reflective layer 3 should have a reflectance of 15–75% to near infrared radiation.

The light absorptive layer 2 (or 2') contains a coloring matter. The coloring matter referred to herein may be any one having absorption in the vicinity of high energy beam wavelength region, and is particularly preferably one having its maximum absorption in the vicinity of said region. The coloring matter referred to previously in the explanation of the reflective layer 3 is similar to the coloring matter referred to herein.

In this connection, it is to be noted that the light absorptive layer can be classified roughly into a monolayered one and a double-layered one. The former monolayered light absorptive layer 2 includes (i') the one formed of a coloring matter alone, (ii') the one formed of a coloring matter and a binder resin, (iii') the one formed of a coloring matter, metal particles and/or metal compound and a binder resin, and the like. The latter double-layered light absorptive layer 2' is generally comprised of a coloring matter-free first light absorptive layer 21 and a coloring matter-containing second light absorptive layer 22.

Accordingly, the first light absorptive layer 21, as is evident from the following description, is in such a state that metal particles having a particle diameter of 200–2000 Å (average particle diameter: about 200 Å) and/or metal compound have been dispersed uniformly or substantially uniformly in a binder resin so that the total sum of said metal particles and/or metal compound may have a volume ratio of 1–30%, preferably 2–10%. In this case, the amount of metal particles contained in the first light absorptive layer 21 is very small. This is also applicable to the aforesaid (iii') in the light absorptive layer 2. The above mentioned volume ratio (1–30%) is widely different in the percentage of metal particles (and/or metal compound) occupying per unit surface area of said light absorptive layer from that in the reflective layer 3. The first light absorptive layer 21 may sometimes contain a coloring matter depending on the manufacturing process of recording medium, but there is no disadvantage resultant therefrom.

There is a tendency that in case said value is less than 1% the ability of the light absorptive layer 21 to absorb the high density energy beam is deteriorated, while in case it is greater than 30% the writing characteristic is deteriorated.

On the other hand, the second light absorptive layer 22 is formed of a coloring matter alone or formed of a coloring matter and a binder resin.

Referring to the binder resins in the cases where the reflective layer 3 contains a binder resin and where the light absorptive layer 2 contains a binder resin and also the binder resin in the first light absorptive layer 21, as can be understood from the explanation of the manufacturing process of recording medium to be made afterwords, it is very probable that those binder resins are consequently of the same kind. As the like binder resins there can be enumerated starch, water soluble cellulose, tannin, alginic acid, polyvinyl alcohol, polyethylene oxide, sodium polyacrylate, polyacrylamide, polyvinyl pyrrolidone, polyacrylic acid, cellulose acetate, polyvinyl butyral, polyesters, silicone resin, polyvinyl chloride, urea resin, polycarbonate and the like, and additionally there can be used a copolymer of for instance vinyl chloride with maleic anhydride, acrylic acid or phthalic acid or the like. In any case, the above binder resins are selected properly, taking into consideration their mutual solubility with other ingredients and the like. These resins may be used singly or in combinations of two kinds or more. However, water-insoluble resins are unsuitable for the manufacture of recording mediums as shown in FIGS. 3, 4, 5 and 7.

The metals for use in said metal particles include Ag, Au, Cu, Pd, Fe, Co, Ni, Ti, V, Si, Ge, Be, Th, Mn, Pt, Rh, Ir, Tc, Re, Ru, Os, Mo, Ta, Al, In, Sn, Se, Te, Cr, Bi, Hf, Y, Nd, Zr, W, Zn, Mg, Sc, Nb, La, Pr and the like. Among them, Ag and Au, especially Ag is effective.

Further, said metal compounds (metal salts, metal complex salts) include silver nitrate, silver potassium cyanide, gold potassium cyanide, silver ammine complex, silver cyan complex, gold salt or gold cyan complex, nickel sulfate, copper sulfate, palladium chloride, hexaammine cobalt salt, potassium ferricyanide, ferrous chloride, ferric chloride, zinc sulfate, and the like.

Various means can be employed for forming the recording layer of the recording medium according to the present invention. First, as the said means employable in the recording mediums having the monolayered light absorptive layer 2 (those illustrated in FIGS. 1, 2, 3, 4 and 5) there can be considered for instance (a) a process comprising making said metal compound (metallic salt and/or metallic complex salt), a reducing agent, and a coloring matter coexist in a resin solution, dissolving them in situ, thereafter applying the resulting solution on a substrate 1, holding the same under a proper temperature condition for reducing said metal compound with said reducing agent, and separating fine powdery metal on the interface; (b) a process comprising forming a light absorptive layer 2 consisting of coloring matter alone or containing a coloring matter in the binder resin on a substrate 1 by vapordeposition, coating or the like and thereafter forming a reflective layer 3 thereon by plating; (c) a process comprising forming a reflective layer 3 on a substrate 1 by plating and thereafter forming thereon a light absorptive layer 2 consisting of a coloring matter alone or containing a coloring matter in a binder resin by vapordeposition, coating or the like; (d) a process comprising making said metal compound and a reducing agent coexist in a resin solution, dissolving them in situ, thereafter applying the resulting solution on a substrate 1, holding the same under a proper temperature condition for forming a reflective layer 3, then cleaning this reflective layer 3 with a solvent and successively forming on this reflective layer 3 a light absorptive layer 2 consisting of a coloring matter alone or containing a coloring matter in a binder resin by vapordepositing method, coating method or the like; and the like.

These processes of making recording mediums having a monolayered light absorptive layer 2 will be explained in more detail hereinafter. In this connection, it is to be noted that the binder resins enumerated previously as being usable in forming the first light absorptive layer 21 are themselves usable herein.

Regarding Process (a):

Said metal compound, reducing agent and coloring matter are dissolved in the resin by using water or a suitable solvent. The suitable amount of metal compound to resin (binder resin) is 0.1–10, preferably 0.5–1.5 in terms of weight ratio. The suitable amount of said reducing agent is 0.5–10 mols, preferably 2–4 moles per mol of the metal compound.

As the reducing agents used suitably herein, there can be enumerated formalin, tartaric acid, tartrate, reducing sugar, hypophosphite, sodium hydride, dimethylaminoborane and the like. The recording mediums produced by Process (a) are those illustrated in FIGS. 1, 2, 3, 4 and 5.

The thus prepared recording layer-forming solution is coated on the substrate 1 or on the undercoat 4. The solid concentration in this recording layer-forming solution is about 5-70 wt.%, preferably about 10-50 wt. %.

The thus coated solution is dried for forming the recording layer consisting of the light absorptive layer 2 and the reflective layer 3, wherein the thickness of coated film of the recording layer-forming solution is regulated so that the thickness of the recording layer may be in the range of 0.1-10 μm, preferably 0.5-2 μm.

As the heating means effective for drying the recording layer-forming solution, namely for the formation of the recording layer there can be enumerated a convection oven, contact heat source, panel heating and the like. The heating temperature is influenced by the composition or components (compounding ratios of components) of the recording layer-forming solution and further widely influenced by the difference in the construction of the recording layer.

When intending to form the recording layer wherein the reflective layer 3 is located on the surface side thereof as shown in FIG. 1 and FIG. 2, heating of the coated recording layer-forming solution may be effected at a time at a temperature of 150° C. or more, preferably in the range of 200°-250° C. Heating must be continued at least until the reflective layer 3 comprising metal particles is formed on the surface of the recording layer.

When intending to form the recording layer wherein the reflective layer 3 is located on the back side thereof as shown in FIG. 3 and FIG. 4, heating of the recording layer-forming solution may be effected at a temperature of 50°-150° C., preferably 50°-100° C. more preferably, it is followed by a second drying effected at a temperature of 100°-250° C., preferably in the range of 150°-200° C. In case heating is effected in two-stage the first heating may be effected to such an extent that the surface of the recording layer, when lightly touched hand, does not stick thereto, while the second heating must be continued at least until the reflective layer 3 comprising metal particles is formed on the back of the recording layer (namely, on the substrate 1 or the undercoat 4').

Although the reason why employment of the above mentioned heating conditions permits to form the reflective layer 3 comprising metal particles on the surface or back of the recording layer has not been investigated minutely, it is deemed that one or two or more metal particles separate on the interface and act as the nucleus of the metal particle layer, namely, the reflective layer 3, whereby the reflective layer 3 is formed. The separation of fine metal particles is also observed in the light absorptive layer 2—the light absorptive layer 2 contains a coloring matter—but its amount is very small. And, it is considered that in the light absorptive layer 2 there are present (i) metal compounds that have not taken part in the reduction reaction, (ii) metal oxides resultant from heat change of said metal compounds (i) at the time of forming the recording layer, (iii) reducing agent that has not taken part in the reduction reaction, (iv) a certain kind of compound resultant from heat change of said reducing agent (iii) at the time of forming the recording layer and (v) some kind of compounds resultant from reduction of metal compounds by the reducing agent. However, the amounts of these (ii), (iii), (iv) and (v) contained are considered very small. And, these (i), (ii), (iii), (iv) and (v) come to disperse, in like manner as said fine metal particles, uniformly or substantially uniformly in the binder resin as it becomes hardened.

Next, when intending to form the recording layer wherein reflective layers 3 and 3 are located on both sides of the recording layer with the light absorptive layer 2 interposed therebetween as shown in FIG. 5, heating of the recording layer-forming solution coated on the substrate 1 or undercoat 4' may be effected in the manner of firstly drying it at a temperature of 50°-150° C., preferably 50°-100° C. and thereafter secondly drying it at a temperature of 150° C. or more, preferably in the range of 180°-300° C. In this instance, the first heating may be effected so as to dry the recording layer to such an extent that the surface of the recording layer, when lightly touched by hand, does not stick thereto, while the second heating must be continued at least until the reflective layers 3 and 3 comprising metal particles are formed on the surface and back of the recording layer (namely, on the substrate 1 or the undercoat 4'). When such heating conditions are employed, there can be observed separation of metal particles on two interfaces. The state of the light absorptive layer 2 in the recording layer illustrated in FIG. 5 is the same as previously stated.

These constructions of the recording layer as shown in FIG. 1 (or FIG. 2); FIG. 3 (or FIG. 4); and FIG. 5 are formed through the heating operations as mentioned above respectively. In this connection, it is to be noted that although the heating conditions for the formation of recording layers shown in FIG. 3 (or FIG. 4) and FIG. 5 respectively overlap partly as is evident from the aforegoing description and so seem to be contradictory, in fact there is no fear of causing disadvantages. The reason is that the reaction conditions and the like get changed depending upon the differences in materials used and their mixing percentages. Accordingly, it comes to that when preparing a recording layer using the same material and under the same heating condition there is obtained either one illustrated in FIG. 3 (or FIG. 4) or one illustrated in FIG. 5.

When the heating operation has thus finished, the reflective layer 3 (or 3 and 3) comes to take the form of a mirror which has a metallic luster and displays a high reflective index.

Regarding Process (b):

A solution comprising a coloring matter alone or a solution prepared by dissolving a coloring matter in a resin solution is applied onto the substrate 1 by vapor-deposition method, coating method or the like to thereby form the light absorptive layer 2 by vapardeposition, coating or the like. Then, the reflective layer 3 is formed thereon by metal plating. In this case, the plated reflective layer 3 is in such a state that metal particles having a particle diameter of 1500 Å or less have been distributed closely. The recording mediums produced by Process (b) are those illustrated in FIGS. 1 and 2.

The plating used profitably herein is nonelectrode plating. The nonelectrode plating, which comprises plating metals on the surface of a substance by the application of chemical substitution and reduction operation between metals without utilizing electric energy as is done in electroplating, is also named chemical plating.

The composition of this plating bath is consisted basically of metal salts and a reducing agent and, if needed, added with a pH modifier, a pH buffering agent, an accelerator, an acetifying agent, a stabilizer and the like. Metal salts used in nonelectrode plating include nickel chloride, nickel sulfate, nickel hypophosphite, nickel acetate, cobalt sulfate, cobalt hypophosphite cobalt chloride, silver nitrate, silver cyanide, gold cyanide, gold chloride, potassium chloroaurate, chromium bromide, chromium chloride, chromium fluoride and the like. The reducing agent used herein includes formaldehyde, paraformaldehyde, sodium citrate, sodium tartrate, hydrazine, dimethylamine borane, grape sugar, glycerine, rochelle salt, glyoxal and the like.

Although the plating conditions are to be changed depending on the prescription of plating both, plating is generally carried out for several seconds–1 hour under the conditions: pH 1.0–10 and temperature 0°–100° C.

Regarding Process (c):

It is profitable also in this case to employ the nonelectrode plating described in the preceding (b). The recording mediums produced by Process (c) are those illustrated in FIGS. 3 and 4.

Regarding Process (d):

The recording mediums produced by Process (d) are those illustrated in FIGS. 3 and 4. Hereat, Process (d) will be described in more detail. First, the aforesaid metal compound (metal salt and/or metal complex) and the reducing agent are dissolved in a binder resin solution by using the suitable solvent such as water or the like. According to circumstances, there may be employed a solution made by dispersing metal particles in a binder resin solution. The resulting solution or dispersion is applied onto the substrate 1 and the same is heat-treated at a temperature of 50°–250° C. to form the metallic reflective layer such as a metallic film or metallic fine particle film. Then, this metallic reflective layer is washed with the suitable solvent such as water to thereby remove residua of the binder resin, metal salt, metal complex, reducing agent, reaction product and the like. In succession, on the thus cleaned reflective layer 3 is formed the light absorptive layer 2 composed of a coloring matter alone or containing a coloring matter in a binder resin.

Figure 6:
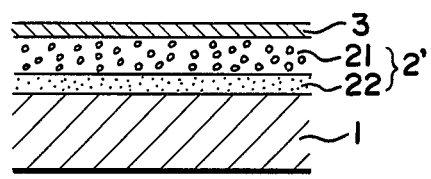

Next, referring to the manufacture of recording mediums (illustrated in FIGS. 6 and 7) having a double-layered light absorptive layer 2' consisted of a first absorptive layer 21 and a second absorptive layer 22, there can be considered various processes for that purpose, for instance, Process (e) for the production of the recording medium illustrated in FIG. 6 which comprises forming, on a substrate 1, a second light absorptive layer 22 consisting of a coloring matter alone or containing a coloring matter in a binder resin and then forming thereon a first light absorptive layer 21 and a reflective layer 3 in order by using the same procedure as the preceding (a) (wherein, a coloring matter is generally not contained but may be contained as occasion demands); Process (f) for the production of the recording medium illustrated in FIG. 7 which comprises forming a reflective layer 3 and a first light absorptive layer 21 on a substrate 1 in order according to the procedure as employed in the preceding (a) and then forming on the same a second light absorptive layer 22 consisting of a coloring matter alone or containing a coloring agent in a binder resin; and the like.

The processes for the production of recording mediums having said double-layered light absorptive layer 21 and 22 will be explained more concretely hereinafter.

Regarding Process (e):

In order to form the reflective layer 3 on the surface side as mentioned previously, it is desirable that the solution obtained by dissolving said metal compound, reducing agent and binder resin in the proper solvent such as water or the like (a coloring matter is sometimes added thereto as occession demands) should be applied onto the second light absorptive layer 22 and the same should be heated and dried at a stroke at a temperature of 150° C. or more, preferably 200°–250° C.

Regarding (f):

A solution obtained by dissolving said metal compound and reducing agent in a binder resin solution is applied onto the substrate 1 and the same is heated at a temperature, for instance, such as 50°–150° C., preferably 60°–100° C. and dried, whereby a reflective layer 3 consisting essentially of metal particles is formed on the side of the substrate 1. On the other hand, on the surface side is formed the first light absorptive layer 21 containing metal particles and/or metal compound. In succession, the second light absorptive layer 22 is formed on the first light absorptive layer 21. The second light absorptive layer 22 referred to herein may be consisted of the coloring matter alone or may contain the coloring matter in the binder resin.

The processes (a)–(f) for the production of 7 recording mediums according to the present invention, which are different in layer construction from each other, have been explained up to now. However, all these recording mediums have the following points in common: (i) the thickness of the metallic reflective layer 3 is properly controlled so that the reflectance of the metallic reflective layer 3 to near infrared ray may be about 15–75%, and (ii) the amount of the coloring matter added to the light absorptive layer 2 (or the second light absorptive layer 22) is properly controlled so as to be about 0.002–10, preferably 0.01–1.0 against the amount of the binder resin in terms of weight ratio. The light permeability of the light absorptive layer 2 (or 2') to near infrared radiation preferably should be reduced to 10% or less. It is to be noted that in case where the light absorptive layer 2 (or the second light absorptive layer 22) is consisted of a coloring matter alone, it is preferable that the light permeability of this layer to near infrared ray should be reduced to 10% or less.

Further, it is to be noted that the thickness of each of the layers (metallic reflective layer 3, light absorptive layer 2, first light absorptive layer 21 and second light absorptive layer 22) somewhat changes depending upon the difference in the manufacturing means described in the preceding (a)–(f).

In more detail, in the case of the recording medium of the type described in the preceding (a) where the metallic reflective layer 3 and the light absorptive layer 2 are formed simultaneously, the total film thickness of both layers properly is 0.1–10 $\mu$m, preferably 0.3–2 $\mu$m.

In the recording mediums of the type obtained by processes (b) and (c), it is desirable that the thickness of the metallic reflective layer (plated layer) 3 should be about 0.01–0.05 and the thickness of the light absorptive layer 2 should be about 0.1–10 $\mu$m.

In the recording medium of the type obtained by the process described in the preceding (d), the thickness of the metallic reflective layer 3 may suffice if it be properly controlled so that its reflectance to near infrared ray may be 15–75% as stated previously, while the thickness of the light absorptive layer 2 suitably is about 0.1–10 $\mu$m.

Concerning the thickness of the reflective layer, light absorptive layer and the like of recording mediums of the type obtained by processes stated in the preceding (e) and (f), the relevant description made in the preceding (a), (b), (c) and (d) is itself applicable thereto.

The typical coloring matters suitably used in the present invention are enumerated as follows. These coloring matters may be used singly or in combinations of two or more.

(1) Direct dyes

These dyes include azo, stilbene, thiazole, dioxazine, phthalocyanine dyes and the like classified from chemial constitutions. Typical dyes of each system will be enumerated hereinafter.
(a) Azo system
C.I. Direct
Yellow 12 (C.I. 24895)
Orange 29 (C.I. 29155)
Red 2 (C.I. 23500)
Violet 7 (C.I. 27855)
Blue 41 (C.I. 42700)
Green 33 (C.I. 34270)
Green 59 (C.I. 34040)
Brown 25 (C.I. 36030)
Black 22 (C.I. 35435)
Black 56 (C.I. 34170)
(b) Stilbene system
C.I. Direct—Yellow 39
C.I. Direct—Black 62
(c) Phthalocyanine system
C.I. Direct—Blue 86 (C.I. 74180)

(2) Acid dye (a) Azo system
C.I. Acid
Yellow 36 (C.I. 13065)
Orange 56 (C.I. 22895)
Red 9 (C.I. 15635)
Violet 7 (C.I. 18055)
Blue 29 (C.I. 20460)
Green 35 (C.I. 13361)
Black 26 (C.I. 27070)
(b) Anthraquinone system
C.I. Acid
Violet (C.I. 61710, 61800)
Blue 23 (C.I. 61125)
Green 44 (C.I. 61590)
Black 48 (C.I. 65005)
(c) Triphenylmethane system
C.I. Acid
Violet 49 (C.I. 42640)
Blue 83 (C.I. 42660)
Green 16 (C.I. 44025)
(d) Xanthene system
C.I. Acid—Red 92 (C.I. 45410)
(e) Azine system
C.I. Acid
Red 59 (C.I. 50315)
Black 2 (C.I. 50420)

(3) Basic dyes (a) Cyanine system
C.I. Basic
Red 12 (C.I. 48070)
Violet 7 (C.I. 48020)
(b) Azo system
C.I. Basic
Brown 1 (C.I. 21000)
Black 2 (C.I. 11825)
(c) Azine system
C.I. Basic
Red 2 (C.I. 50240)
Red 1 (C.I. 45160)
Violet 10 (C.I. 45170)
Blue 3 (C.I. 51005)
Blue 25 (C.I. 52025)
(d) Triphenylmethane system
C.I. Basic
Red 9 (C.I. 42500)
Violet 3 (C.I. 42555)
Blue 1 (C.I. 42025)
Green 4 (C.I. 42000)

(4) Mordant dyes and acid mordant dyes (a) Azo system
C.I. Mordant
Yellow 1 (C.I. 14025)
Yellow 26 (C.I. 22880)
Orange 37 (C.I. 18730)
Red 9 (C.I. 16105)
Violet 5 (C.I. 15670)
Blue 13 (C.I. 16680)
Green 11 (C.I. 20440)
Black 9 (C.I. 16500)
(b) Anthraquinone system
Mordant
Red 3 (C.I. 58005)
Blue 8 (C.I. 58805)
Black 13 (C.I. 63615)
Xanthene system
Mordant—Red 15 (C.I. 45305)
(d) Triphenylmethane system
Mordant
Violet 1 (C.I. 43565)
Blue 47 (C.I. 43855)

(5) Vat colors (a) Anthraquinone system
C.I. Vat
Yellow 2 (C.I. 67300)
Yellow 4 (C.I. 59100)
Orange 2 (C.I. 59705)
Red 10 (C.I. 67000)
Violet 13 (C.I. 68700)
Blue 18 (C.I. 59815)
Green 8 (C.I. 71050)
Black 9 (C.I. 65230)
Green 1 (C.I. 59825)
(b) Indigoid system
C.I. Vat
Orange 5 (C.I. 73335)
Orange 7 (C.I. 71105)
Red 2 (C.I. 73365)
Violet 2 (C.I. 73385)
Blue 1 (C.I. 73000)

(6) Disperse dyes (a) Azo system
C.I. Disperse
Yellow 7 (C.I. 26090)
Orange 5 (C.I. 11100)
Red 7 (C.I. 11150)
Violet 24 (C.I. 11200)
(b) Anthraquinone system
Orange 11 (C.I. 60700)

Red 11 (C.I. 62015)
Violet 4 (C.I. 61105)
Blue 27 (C.I. 60767)

(7) Oil soluble colors (a) Azo system
C.I. Solvent
Yellow 6 (C.I. 11390)
Orange 5 (C.I. 18745)
Red 27 (C.I. 26125)
Brown 5 (C.I. 12020)
(b) Anthraquinone system
Violet 14 (C.I. 61705)
Blue 11 (C.I. 61525)
Green (C.I. 61565)
(c) Phthalocyanine system
Solvent—Blue 25 (C.I. 74350)
(d) Triphenylamethane system
051 (C.I. 21260)

The processes for the production of recording mediums have been explained up to now taking water as the example of the solvent. However, it is to be noted that the other solvents may be used. Said solvents include alcohol, ketones, toluene, benzene, esters, ether and the like. As the solution-coating methods there can be enumerated the widely used coated film forming methods such as brush-coating, roller-coating, flow-coating, rotation-coating, spray-coating and the like.

In the case of the recording medium wherein the light absorptive layer is free from a binder and is formed of a coloring matter alone, as stated previously, coating method, vapordepositing method and the like are employed for the formation of its light absorptive layer. The recording medium of the type wherein the light absorptive layer is formed of a coloring matter alone can obtain a high quality recorded matter with less recording energy because it is superior in light absorbability as compared with the recording medium of the type wherein the light absorptive layer is formed of a coloring matter with a binder.

The recording medium of the type wherein the metallic reflective layer is formed of metal particles alone is observed to be superior especially in the S/N ratio and sensitivity and additionally in the stability and preservability. The reason is that when substances other than metal particles are present in the metallic reflective layer, the recording medium absorbs moisture and absorbs dust and gases thereon due to said substances, which leads to the fact that the recording layer is deteriorated with the lapse of time.

In preparing the optical information recording medium of the present invention referred to heretofore, there can be employed both the batch type system and the continuous system. This recording medium may be made into a disc, rectangle (including a regular square) or belt form.

When writing in the recording medium according to the present invention, as usual, a high density energy beam (for instance, laser beam) may be radiated in the direction from the reflective layer 3 to the light absorptive layer 2 (or 2'), whereby holes are perforated in the reflective layer 3 and recording is made. In the case of the recording medium illustrated in FIG. 5, information may be recorded on both sides. This is because when recording is made on the surface side of the recording medium it exerts no influence upon the reflective layer 3 on the side of the substrate 1, while when recording is made on the side of the substrate 1 of the recording medium it exerts no influence upon the reflective layer 3 on the surface side. The reason why "the recording operation exerts no influence" like this consists in that said high density energy beam has been absorbed mainly by the light absorptive layer 2.

In order to read out the recording medium, a low output-high density energy beam is radiated onto said recording medium and reading may be done from changes in the amount of beam reflected from or permeated through the recording medium. In case reading is done from changes in the amount of beam permeated through the recording medium, as stated previously, the substrate 1 and undercoat 4, 4' must be transparent to the high density energy beam used as well as the strength sufficient to withstand said beam.

EXAMPLES

Example 1

| | |
|---|---|
| Polyvinyl alcohol | 1 g |
| Water | 9 g |
| Silver nitrate | 1 g |
| 28% ammonia water | 1 ml |
| 35% formalin solution | 0.1 ml |
| C.I. Direct Blue 41 (C.I. 42700) | 0.5 g |

A solution having the above composition was coated on an optically polished glass by means of rotation-coating method. This was treated for 10 minutes on a plate heated to 200° C. to thereby form a recording layer having a thickness of about 1.2 μm. Thus, there was prepared a recording medium (our product 1) of the type shown in FIG. 1.

Example 2

| | |
|---|---|
| Polyvinyl alcohol | 1 g |
| Water | 9 g |
| Silver nitrate | 2 g |
| Grape sugar | 1.5 g |
| C.I. Mordant Blue 13 (C.I. 16680) | 0.4 g |

A solution having the above composition was coated in the exactly same manner as Example 1. This was treated for 20 minutes in an oven maintained at 150° C. to thereby form a recording layer having a thickness of about 1.3 μm. Thus, there was prepared a recording medium (our product 2) of the type shown in FIG. 1.

Example 3

| | |
|---|---|
| Polyvinyl pyrrolidone | 2 g |
| Water | 8 g |
| Silver potassium cyanide | 0.5 g |
| Sodium tartrate | 0.6 g |
| C.I. Acid Blue 83 (C.I. 42660) | 0.4 g |

A solution having the above composition was coated a glass substrate by means of dipping method. This was treated for 15 minutes on a plate maintained at 250° C. to thereby form a recording layer having a thickness of about 0.9 μm. Thus, there was prepared a recording medium (our product 3) of the type shown in FIG. 1.

Example 4

| | |
|---|---|
| 5% aqueous polyacrylamide solution | 10 g |

| | |
|---|---|
| Copper sulfate | 0.4 g |
| 28% ammonia water | 2 ml |
| Sodium boron hydride | 0.3 g |
| C.I. Direct Blue 41 (C.I. 42700) | 0.3 g |

A solution having the above composition was coated on a glass substrate by means of rotation-coating method. This was treated for 5 minutes in a high temperature furnace maintained at 350° C. to thereby form a recording layer having a thickness of about 0.7 μm. Thus, there was prepared a recording medium (our product 4) of the type shown in FIG. 1.

Example 5

| | |
|---|---|
| Polyvinyl pyrrolidone | 1 g |
| Water | 9 g |
| Silver nitrate | 1.5 g |
| 28% ammonia water | 1.5 ml |
| Sodium tartrate | 1.2 g |
| C.I. Vat Blue (C.I. 73000) | 0.3 g |

A solution having the above composition was coated on a glass substrate, provided previously with an undercoat having a thickness of about 2 μm by coating polycarbonate resin thereon, and same was heated for 5 minutes on a plate maintained at 200° C. to thereby form a recording layer having a thickness of about 1.1 μm. Further, this recording layer was coated with a toluene solution of polystyrene and dried to thereby form an overcoat having a thickness of about 1 μm. Thus, there was prepared a recording medium (our product 5) of the type shown in FIG. 2.

Example 6

| | |
|---|---|
| Polyvinyl alcohol | 1 g |
| Water | 9 g |
| Silver nitrate | 2 g |
| 28% ammonia water | 2 ml |
| Grape sugar | 1 g |
| C.I. Acid Blue 9 (C.I. 42090) | 1 g |

A solution having the above composition was coated on a glass substrate by means of rotation-coating method. This was dried in an oven maintained at 50° C., and further heated for 20 minutes on a plate heated to 110° C. to thereby form a recording layer having a thickness of about 1.4 μm. Thus, there was prepared a recording medium (our product 6) of the type shown in FIG. 3.

Example 7

| | |
|---|---|
| Polyvinyl alcohol | 0.8 g |
| Water | 9 g |
| Gold potassium cyanide | 1.5 g |
| Sodium tartrate | 0.2 g |
| C.I. Acid Blue 9 (C.I. 42090) | 0.4 g |

A solution having the above composition was coated in the same manner as Example 6. This was dried in an oven (60° C.) and further heated for 15 minutes on a plate heated to 150° C. to thereby form a recording layer having a thickness of about 0.7 μm. Thus, there was prepared a recording medium (our product 7) of the type shown in FIG. 3.

Example 8

| | |
|---|---|
| Polyvinyl pyrrolidone | 2 g |
| Water | 8 g |
| Silver nitrate | 0.5 g |
| Sodium boron hydride | 0.2 g |
| C.I. Direct Blue 86 (C.I. 74180) | 0.7 g |

A solution having the above composition was coated in the same manner as Example 6. This was dried in an oven (80° C.) and further heated for 15 minutes on a plate heated to 200° C. to thereby form a recording layer having a thickness of about 0.5 μm. Thus, there was prepared a recording medium (our product 8) of the type shown in FIG. 3.

Example 9

| | |
|---|---|
| 5% aqueous polyacrylamide solution | 10 g |
| Silver potassium cyanide | 0.3 g |
| 35% formalin solution | 0.2 ml |
| 8,17-bis(4-phenylaminosulfonate)indanthrene | 0.2 g |

A solution having the above composition was coated on a glass substrate by means of a doctor blade. This was dried in an oven maintained at 120° C. and further heated for 5 minutes in a high temperature furnace heated to 250° C. to thereby form a recording layer having a thickness of about 1.2 μm. Thus, there was prepared a recording medium (our product 9) of the type shown in FIG. 3.

Example 10

| | |
|---|---|
| Polyvinyl alcohol | 0.5 g |
| Water | 9 g |
| Silver nitrate | 0.3 g |
| 28% ammonia water | 1 ml |
| Rochelle salt | 0.4 g |
| C.I. Solvent Brown 5 (C.I. 12020) | 1.0 g |

A solution having the above composition was coated on a glass substrate by dipping. This was dried in an oven maintained at 60° C. and further heated for 15 minutes on a plate heated to 200° C. to thereby form a recording layer having a thickness of about 0.5 μm. Thus, there was prepared a recording medium (our product 10) of the type shown in FIG. 3.

Example 11

| | |
|---|---|
| Polyvinyl alcohol | 1 g |
| Water | 9 g |
| Silver nitrate | 1 g |
| 28% ammonia water | 2 ml |
| Grape sugar | 1 g |
| C.I. Acid Blue 59 (C.I. 50315) | 0.5 g |

A solution having the above composition was coated on a glass substrate by rotation-coating method. This was dried in an oven maintained at 80° C. and further heated for 15 minutes on a plate heated to 150° C. to thereby form a recording layer having a thickness of about 0.8 μm. Thus, there was prepared a recording medium (our product 11) of the type shown in FIG. 3.

Example 12

| | |
|---|---|
| Polyvinyl alcohol | 1 g |
| Water | 9 g |
| Silver nitrate | 0.5 g |
| 28% ammonia water | 0.5 ml |
| 35% formalin solution | 0.1 ml |
| C.I. Solvent Blue 25 (C.I. 74350) | 0.3 g |

A solution having the above composition was coated on an optically polished glass plate by rotation-coating method. This was dried at 80° C. and thereafter heated for 10 minutes on a plate heated to 180° C. to thereby form a recording layer having a thickness of about 0.8 μm. Thus, there was prepared a recording medium (our product 12) of the type shown in FIG. 3.

Example 13

The 10% methylene chloride solution of polycarbonate resin was coated on the glass substrate used in Example 12 and dried to thereby form an undercoat having a thickness of about 2 μm. Thereafter, a recording layer was formed on this undercoat in the same manner as Example 12 except that the coloring matter used was changed from 0.3 g of C.I. Solvent Blue 25 (C.I. 74350) to 0.4 g of C.I. Acid Blue 9 (C.I. 42090). Thus, there was prepared a recording medium (our product 13) of the type shown in FIG. 4.

Example 14

The exactly same procedure as Example 13 was repeated except that the polycarbonate resin used therein was replaced by polysulfone and polyimide respectively to thereby obtain recording mediums (our products 14 and 14').

Example 15

| | |
|---|---|
| Polyvinyl pyrrolidone | 3 g |
| Water | 7 g |
| Gold potassium cyanide | 0.5 g |
| Potassium hydrophosphite | 0.16 g |
| C.I. Direct Blue 108 (C.I. 51320) | 0.6 g |

A solution having the above composition was coated on a 1.5 mm-thick acrylic plate by rotation-coating method. This was dried at 90° C. and thereafter heated for 10 minutes in an oven heated to 120° C. to thereby form a recording layer having a thickness of about 1.2 μm. Thus, there was prepared a recording medium (our product 15) of the type shown in FIG. 3.

Example 16

The exactly same procedure as Example 15 was repeated except that the acrylic plate used therein was replaced by 2 mm-thick polysulfone resin and polyimide plates respectively and the coloring matter used was changed from 0.6 g of C.I. Direct Blue 108 (C.I. 51320) to 0.6 g of bis(3,6-dimethyl-1,2-dithiolate) nickel tetrapropyl ammonium. Thus, there were obtained recording mediums (our products 16 and 16'). In this instance, the drying temperature used for the formation of a recording layer was 90° C. and the heating temperature for that purpose was 180° C. These products 16 and 16' according to the present invention are of the type shown in FIG. 3.

Example 17

| | |
|---|---|
| Polyvinyl alcohol | 1 g |
| Water | 9 g |
| Silver nitrate | 1 g |
| 28% ammonia water | 1 ml |
| 35% formalin solution | 0.1 ml |
| 8,17-bis[4-(4-sodium sulfonate-phenylthio)-phenylamino]indanthrene | 0.6 g |

A solution having the above composition was coated on a glass substrate by means of rotation-coating method. This was dried in an oven maintained at 60° C. and further heated for 10 minutes on a plate maintained at 250° C. to thereby form an about 1.0 μm-thick recording layer. Thus, there was prepared a recording medium (our product 17) of the type shown in FIG. 5.

Example 18

| | |
|---|---|
| Polyvinyl pyrrolidone | 2 g |
| Water | 8 g |
| Silver potassium cyanide | 2 g |
| Grape sugar | 1.5 g |
| C.I. Basic Green 4 (C.I. 42000) | 0.5 g |

A solution having the above composition was coated on a glass substrate by means of rotation-coating method. This was dried in an oven maintained at 80° C. and further heated for 25 minutes on a plate maintained at 150° C. to thereby form an about 1.2 μm-thick recording layer. Thus, there was prepared a recording medium (our product 18) of the type shown in FIG. 5.

Example 19

| | |
|---|---|
| Polyvinyl pyrrolidone | 2 g |
| Water | 8 g |
| Gold potassium cyanide | 0.4 g |
| Sodium tartrate | 0.3 g |
| C.I. Acid Blue 9 (C.I. 42090) | 0.5 g |

A solution having the above composition was coated on a glass substrate. This was dried in an oven maintained at 120° C. and further heated for 10 minutes in a high temperature furnace maintained at 350° C. to thereby form an about 1.0 μm-thick recording layer. Thus, there was obtained a recording medium (our product 19) of the type shown in FIG. 5.

Example 20

| | |
|---|---|
| 5% aqueous polyacrylamide solution | 10 g |
| Silver nitrate | 1.5 g |
| Sodium boron hydride | 0.4 g |

A solution having the above composition was coated on a glass substrate. This was dried in an oven maintained at 60° C. and further heated for 5 minutes on a plate heated to 200° C. to thereby form an about 1.2 μm-thick recording layer. Thus, there was obtained a recording medium (our product 20) of the type shown in FIG. 5.

Example 21

| | |
|---|---|
| Polyvinyl alcohol | 1 g |

-continued

| | |
|---|---|
| Copper sulfate | 0.6 g |
| 28% ammonia water | 2 ml |
| Rochelle salt | 1 g |
| C.I. Direct Blue 41 (C.I. 42700) | 0.5 g |

A solution having the above composition was coated on a glass substrate. This was dried in an oven heated to 100° C. and further heated for 15 minutes in a high temperature furnace heated to 300° C. to thereby form an about 1.0 μm-thick recording layer. Thus, there was obtained a recording medium (our product 21) of the type shown in FIG. 5.

Example 22

| | |
|---|---|
| Polysulfone | 2 g |
| Dichloroethane | 20 ml |
| C.I. Mordant Blue 8 (C.I. 58805) | 0.8 g |

A solution having the above composition was coated on a glass substrate, and dried to form an about 0.9 μm-thick second light absorptive layer.

| | |
|---|---|
| Polyvinyl alcohol | 1 g |
| Water | 9 g |
| Silver nitrate | 1 g |
| Grape sugar | 1.5 g |

A solution having the above composition was further coated on this layer by rotation-coating method. The same was dried for 15 minutes in an oven maintained at 200° C. to thereby prepare a recording medium (our product 22) of the type shown in FIG. 6 wherein the entire thickness of the first absorptive layer and the reflective layer is about 1.2 μm.

Example 23

| | |
|---|---|
| Polyvinyl alcohol | 1 g |
| Water | 9 g |
| Silver nitrate | 0.5 g |
| 28% ammonia water | 0.5 ml |
| Grape sugar | 0.5 g |
| Soluble Blue OBB (C.I. 42780) (produced by ORIENT KAGAKU K.K.) | 0.1 g |

A solution having the above composition was coated on an optically polished glass plate by means of rotation-coating method. This was dried at 80° C. for 10 minutes to obtain a recording layer having a thickness of about 0.8 μm. Thus, there was obtained a recording medium (our product 23) of the type shown in FIG. 3.

For the sake of comparison, a sample was prepared using the same composition except that the coloring matter was not added thereto. On 2.5μ seconds' radiation (recording energy: 17.5 nJ/bit), this sample formed a spot having a diameter of 1 μm.

Example 24

| | |
|---|---|
| Polyvinyl pyrrolidone | 3 g |
| Water | 7 g |
| Gold potassium cyanide | 1 g |
| 35% formalin | 0.5 ml |
| Acid milling Skyblue FSE (C.I. Acid Blue 112) (produced by Mitsui Toatsu Kagaku K.K.) | 0.2 g |

A solution having the above composition was coated on an acrylic plate by means of rotation-coating method. This was dried at 60° C. for 10 minutes to obtain a recording layer having a thickness of about 0.4 μm. Thus, there was obtained a recording medium (our product 24) of the type shown in FIG. 3.

For the sake of comparison, a sample was prepared using the same composition except that the coloring matter was not added thereto. This sample was observed to need a recording energy of 19 nJ/bit in order to form a spot having a diameter of 1.0 μm.

Example 25

By using the same composition as Example 23 except that Soluble Blue OBB was replaced by coloring matters shown in the following table, there was obtained the recording sensitivity as shown below respectively.

| Name of producer | Name of coloring matter | C.I. No. | Recording sensitivity (nJ/bit) |
|---|---|---|---|
| Sumitomo Kagaku | Direct Fast Black B | 35453 | 6.3 |
| " | Sumilite Violet BB | 27905 | 7.0 |
| " | Direct Blue 2B | 22610 | 7.0 |
| Hodogaya Kagaku | Aizen Basic Cyanine 6GH | 42025 | 4.9 |
| " | Aizen Methylene Blue BH | 52015 | 4.9 |
| Yamada Kagaku | Alizarine Cyanine Green GWN | 61595 | 5.6 |
| Mitsui Toatsu | Celmazol Brilliant Blue R | 61200 | 5.6 |
| " | Direct Deep Black EX | 30235 | 7.0 |
| " | Mikethren Soluble Blue O | 73002 | 6.3 |
| Nihon Kayaku K.K. | Kayacyl Skyblue R | 62045 | 6.3 |
| " | Kayaku Acid Rhodamine BH | 45100 | 7.7 |
| Orient | Water Blue 9 | | 4.2 |

Example 26

A solution having the same composition as Example 23 except that Soluble Blue OBB was replaced by Nigrosine (produced by Sumitomo Kagaku) was coated on an acrylic plate, and the same was heat-dried at 90° C. for 5 minutes to thereby obtain a recording medium (our product 26) of the type shown in FIG. 3. When recording was conducted on this recording medium from the substrate side using a semi-conductor laser emitting the beam of 820 nm wavelength under the conditions: beam diameter 1.5 μm and radiation surface energy 4 mW, there was formed a spot having a diameter of 0.8 μm by 1.3μ seconds' radiation (recording energy: 5.2 nJ/bit).

In the case where Nigrosine was not added, the recording energy was observed to be 15 nJ/bit.

Example 27

| Polyvinyl alcohol | 0.7 g |
| --- | --- |
| Water | 10 g |
| Silver nitrate | 1.5 g |
| 28% ammonia water | 3 ml |
| Formamide | 1 ml |
| Direct Blue 2B (C.I. 22610) (produced by Sumitomo Kagaku) | 0.5 g |

A solution having the above composition was coated on a toughened acrylic plate and the same was dried at 80° C. for 10 minutes, thereby obtaining a recording medium (our product 27) of the type shown in FIG. 3. This recording medium exhibited the reflectance of 30% and permeability of 5% respectively to the 600–700 nm wavelength beam. When information was recorded on this recording medium from the substrate side using He-Ne laser beam under the conditions: radiation surface energy 5 mW and beam diameter 2.4 μm, a spot was formed on the light absorptive layer by 0.6μ second's radiation (recording energy 3 nJ/bit). The metallic reflective layer was not changed. When continuous 0.5 mW beam radiation was applied on the recorded area for the reading purpose, the amount of light reflected therefrom was observed to be reduced 20%.

It was also observed that energies of 7 mW and 2.5μ sec (17.5 nJ/bit) were needed in order to form a spot on the reflective layer of this recording medium.

Example 28

| Nickel sulfate | 0.1 mol/l |
| --- | --- |
| Sodium citrate | 0.2 mol/l |
| Sodium hypophosphite | 0.2 mol/l |
| Ammonium sulfate | 0.5 mol/l |

A glass plate was nickel-plated in a nickel plating bath having the above composition to obtain an about 0.03 μm-thick nickel layer. Further, a solution comprising 0.3 g of polyvinylbutyral, 5 ml of ethanol and 0.2 g of Water Blue 9 (produced by Orient Kagaku) was coated on said nickel layer to obtain an about 0.2 μm-thick light absorptive layer. Thus, there was obtained a recording medium (our product 28) of the type shown in FIG. 3. Then, this recording medium was recorded and thereafter subjected to the same reading procedures as Example 27 to find that the amount of light reflected from the recorded area was reduced 22%.

Example 29

| Polyvinyl alcohol | 1 g |
| --- | --- |
| Water | 9 g |
| Silver nitrate | 1.5 g |
| 28% ammonia water | 3 ml |
| Grape sugar | 1.5 g |

A solution having the above composition was coated on an acrylic plate by means of rotation-coating method, and the same was dried at 70° C. for 10 minutes to thereby obtain a reflective layer and a first light absorptive layer, the entire thickness of both layers being about 0.6 μm. A solution composed of 0.5 g of polyvinyl butyral, 5 ml of ethanol and 0.1 g of Water Blue 9 (produced by Orient Kagaku) was further applied on this first light absorptive layer, and the same was air-dried to obtain a second light absorptive layer. Thus, there was obtained a recording medium (our product 29) of the type shown in FIG. 7.

For the sake of comparison, there was prepared a sample wherein coating of the second light absorptive layer was omitted. The recording energy in this case was found to be 17.5 nJ/bit.

Example 30

| Polyacrylamide | 0.5 g |
| --- | --- |
| Water | 9.5 g |
| Copper sulfate | 1 g |
| 28% ammonia water | 3 ml |
| 35% formalin | 0.5 ml |

A solution having the above composition was coated on an acrylic plate by means of rotation-coating method, and the same was dried at 100° C. for 5 minutes to obtain a reflective layer and a first light absorptive layer, the entire thickness of both layers being about 0.5 μm. A solution composed of 0.5 g of polyvinyl alcohol, 5 g of water and 0.2 g of Direct Blue 2B (C.I. 22610) (produced by Sumitomo Kagaku) was further applied on this first light absorptive layer to obtain a second light absorptive layer. Thus, there was obtained a recording medium (our product 30) of the type shown in FIG. 7.

For the sake of comparison, there was prepared a sample wherein the addition of coloring matter was omitted. The recording energy in this case was found to be 20 nJ/bit.

Example 31

By using the same composition as Example 29 except that the coloring matters and resins as shown in the following table were employed in the second light absorptive layer-coating solution, there was obtained the recording sensitivity as shown below respectively.

| Name of coloring matter maker | Name of coloring matter | Resin liquid | Color density (%) | Recording sensitivity (nJ/bit) |
| --- | --- | --- | --- | --- |
| Sumitomo Kagaku | Sumiacryl Black cp | Polyvinyl butyral/EtOH 10% | 3 | 7.7 |
| Tokyo Kasei | Chlorozol Black E | Polyvinyl butyral/EtOH 10% | 2 | 9.1 |
| Mitsubishi Kasei | Diamira Brilliant | Polycarbonate/ MDC 10% | 2 | 6.3 |

-continued

| Name of coloring matter maker | Name of coloring matter | Resin liquid | Color density (%) | Recording sensitivity (nJ/bit) |
|---|---|---|---|---|
| | Blue R (C.I. 61200) | | | |
| Mitsui Toatsu | Nylon Black Gt | Polycarbonate/ MDC 10% | 3 | 9.8 |
| Tokyo Kasei | Lyonol Blue GS | Polyester/ benzene 10% | 5 | 9.1 |
| Tokyo Kasei | Trypan Blue | Polyester/ toluene 8% | 3 | 9.1 |
| Hodogaya | Aizen Methylene Blue BH (C.I. 52015) | Polyvinyl alcohol/ water 10% | 5 | 7.7 |
| Sumitomo Kagaku | Direct Dark Green (C.I. 30280) | Polyvinyl butyral/ acetone 7% | 3 | 10.4 |

Example 32

By using a solution having the same composition as Example 29 except that the coloring matter used in the second light absorptive layer was replaced by NK-123 (a coloring matter produced by Nihon Kanko) there was obtained a recording medium (our product 32). When information was recorded on the recording medium from the substrate side using a semi-conductor laser emitting the beam of 820 nm wavelength under the conditions: beam diameter 15 μm and radiation surface energy 4 mW, there was formed a spot having a diameter of 0.8 μm by 1.6μ seconds' radiation (recording energy: 6.4 nJ/bit).

Example 33

| 7% aqueous solution of polyvinyl alcohol | 50 g |
|---|---|
| Formamide | 5 ml |
| Silver nitrate | 7.5 g |
| Ammonia water | 15 ml |
| 50% aqueous solution of grape sugar | 20 ml |

A solution having the above composition was coated on a 1.0 mm-thick acrylic plate, and the same was heat-treated at 80° C. for 5 minutes to form a semi-transparent reflective film (metallic reflective layer) on said acrylic plate, thereby obtaining a brown plate. This plate showed reflectance of 40% (630 nm). This plate was well washed with water to remove therefrom the polyvinyl alcohol, formamide, nitrate and the like. An aqueous solution composed of 50 g of 7% aqueous solution of polyvinyl alcohol and 1 g ($\lambda_{max}$ 630 mμ) of water Blue was coated on the thus cleaned metallic reflective plate, and the same was dried at 80° C. for 5 minutes to form a light absorptive layer. The formed film was about 0.8 μm thick. Thus, there was obtained a recording medium (our product 33) of the type shown in FIG. 3. The S/N ratio of this recording medium was observed to be 50 dB at 0.5 MHz (IF band width 30 KHz). This was left standing in a constant temperature tank (air amount 70% and temperature 60° C.) for 1 week to show that the S/N ratio was reduced to 47 dB.

Example 34

According to the same procedure as Example 33, a semi-transparent reflective film (metallic reflective layer) was formed on an acrylic plate, reflectance of said film being observed 40% (630 nm) and 35% (820 nm), and was fully washed with pure water. A solution composed of 50 g of 5% alcohol solution of polyvinylbutyral and 5 g of Spirit Black 920 (produced by Sumitomo Kagaku Kogyo) was further coated on this metallic layer. The same was dried to form a light absorptive layer having a thickness of about 0.5 μm. Thus, there was obtained a recording medium (our product 34) of the type shown in FIG. 3. The thus obtained recording medium was exposed to the beam having a diameter of 1.6 μm and radiation surface energy 4 mW by means of a laser diode to find that the recording energy required was 10 nJ. This recording medium showed scarce change in characteristics even when stored for a week under the conditions (temperature 60° C. and air amount 70%).

Example 35

| | | |
|---|---|---|
| Solution A | Silver nitrate | 17.5 g |
| | Water | 600 ml |
| | NaOH | 10 g |
| | Ammonia water | added properly until the solution becomes transparent |
| | 10% aqueous solution of polyvinyl alcohol | 50 ml |
| | Formamide | 20 ml |
| Solution B | Grape sugar | 45 g |
| | Tartaric acid | 4 g |
| | Alcohol | 100 ml |
| | Water | 1000 ml |

Solution A was prepared separately from Solution B. 1000 ml of each solution were taken out and mixed together. A pretreated acrylic plate (its one surface was sealed) was dipped in this mixed solution for 10 minutes. The thus treated acrylic plate was taken out, washed well with water, and then dried. Thereafter, an aqueous solution composed of 50 g of 7% aqueous solution of polyvinyl alcohol and 1 g of Water Blue was further applied onto this plate and dried at 80° C. for 5 minutes. The formed film was about 0.8 μm thick. Thus, there was prepared a recording medium (our product 35) of the type shown in FIG. 3. The S/N ratio was observed to be 55 dB at 0.5 MHz (IF band width 30 KHz).

Example 36

| Nickel hypophosphite | 26.7 g |
|---|---|

-continued

| | |
|---|---|
| Boric acid | 5 g |
| Ammonium sulfate | 2.6 g |
| Sodium acetate | 4.9 g |
| Water | 1000 ml |

An acrylic plate was dipped in a solution having the above composition for 5 minutes, washed with water and dried, thereby forming the same coloring layer as Example 35. Thus, there was prepared a recording medium (our product 36) of the type shown in FIG. 3. The S/N ratio of said recording medium was observed to be 40 dB.

The reflectance and absorptance of these recording medium (excluding those whose results had already been measured and given) to near infrared ray were summarized in Table-1. In this regard, it is to be noted that these are values measured (a) from the surface side in the case of recording mediums of the type shown in FIGS. 1, 2 and 6, (b) from the substrate (which is transparent herein) side in the case of recording mediums of the type shown FIGS. 3, 4 and 7, and (c) from each of surface and substrate (which is transparent herein) sides in the case of the recording medium of the type shown in FIG. 5.

In addition thereto, the results obtained by recording these recording mediums using He-Ne laser beam under the conditions: radiation surface energy 7 mW and beam diameter 2.4 μm were also summarized in Table-1. In this connection, it is to be noted that the recording referred to herein was carried out respectively (a') by radiating said laser beam from the surface side in the case of the recording mediums of the type shown in FIGS. 1 and 2, (b') by radiating said laser beam from the substrate side in the case of the recording mediums shown in FIGS. 3 and 4 and (c') by radiating said laser beam from each of the surface and substrate sides.

TABLE 1

| | Reflectance (%) | Absorptance (%) | Recording energy (nJ/bit) | Spot diameter (μm) |
|---|---|---|---|---|
| Our product 1 | 42 | 57 | 3.5 | 1.2 |
| Our product 2 | 30 | 64 | 4.0 | 1.1 |
| Our product 3 | 32 | 59 | 3.2 | 1.3 |
| Our product 4 | 40 | 55 | 3.2 | 1.1 |
| Our product 5 | 36 | 54 | 3.6 | 1.0 |
| Our product 6 | 35 | 61 | 9.4 | 1.2 |
| Our product 7 | 31 | 68 | 7.1 | 1.0 |
| Our product 8 | 34 | 65 | 7.2 | 1.4 |
| Our product 9 | 38* | 59* | 9.9* | 0.8 |
| Our product 10 | 30 | 58 | 6.8 | 1.3 |
| Our product 11 | 40 | 56 | 8.0 | 1.2 |
| Our product 12 | 39 | 55 | 9.7 | 1.0 |
| Our product 13 | 33 | 66 | 4.9 | 1.2 |
| Our product 15 | 32* | 56* | 5.4* | 1.0 |
| Our product 16 and 16' | 32* | 56* | 9.4* | 0.9 |
| Our product 17 | (substrate size) 31* (surface side) 38 | (substrate side) 61* (surface side) 54 | (substrate side) 8.8* (surface side) 4.1 | (substrate side) 0.9 (surface side) 1.1 |
| Our product 18 | (substrate side) 33 (surface side) 36 | (substrate side) 62 (surface side) 61 | (substrate side) 8.7 (surface side) 4.6 | (substrate side) 1.2 (surface side) 1.3 |
| Our product 19 | (substrate side) 33 (surface side) 37 | (substrate side) 60 (surface side) 58 | (substrate side) 7.4 (surface side) 3.8 | (substrate side) 1.1 (surface side) 1.3 |
| Our product 20 | (substrate side) 28* (surface side) 34 | (substrate side) 54* (surface side) 50 | (substrate side) 9.6* (surface side) 6.4 | (substrate side) 0.8 (surface side) 0.9 |
| Our product 21 | (substrate side) 31 (surface side) 36 | (substrate side) 62 (surface side) 58 | (substrate side) 7.2 (surface side) 3.6 | (substrate side) 1.0 (surface side) 1.1 |
| Our product 22 | 36 | 64 | 4.2 | 1.2 |
| Our product 23 | 35 | 60 | 7.0 | 1.1 |
| Our product 24 | 30 | 60 | 4.9 | 1.0 |
| Our product 28 | 35 | 62 | — | — |
| Our product 29 | 30 | 65 | 5.6 | 1.4 |
| Our product 30 | 35 | 60 | 7.0 | 1.2 |
| Our product 33 | — | — | 0.6 μsec** | 0.8 |
| Our product 35 | 40 | — | 0.6 μsec** | 0.8 |

TABLE 1-continued

| | Reflectance (%) | Absorptance (%) | Recording energy (nJ/bit) | Spot diameter (μm) |
|---|---|---|---|---|
| Our product 36 | 30 | — | 1.2 μsec | 0.8 |

Note 1 The results obtained from our products 14 and 14' were observed to be substantially the same as those obtained from our product 13.
Note 2 *denotes the value measured under the conditions where a semi-conductor laser was utilized, the radiation surface energy was a 5 mW and the beam diameter was 2.4 μm respectively.
Note 3 **denotes the value of radiation energy respectively.
Note 4 By way of explanation, it is assumed that the amount of light such as 100 is radiated on the recording medium. When the amount of light such as 30 is reflected therefrom, the reflectance is evaluated 30%. When the amount of light such as 5 permeats therethrough the absorptance is evaluated 65% from the equation $100 - (30 + 5) = 65$.

Example 37

| | |
|---|---|
| Polyvinyl alcohol | 1 g |
| Water | 9 g |
| Silver nitrate | 1.5 g |
| 25% ammonia water | 3 ml |
| Formamide | 0.5 ml |
| Grape sugar | 1.5 g |

A solution having the above composition was coated by dipping method on an acrylic plate provided previously with an undercoat coated with nitrocellulose. The same was heated at 60° C. for 5 minutes and thereafter washed with water to obtain a reflective layer formed of silver particles.

| | |
|---|---|
| Polyvinyl butyral | 1 g |
| Dichloromethane | 9 g |
| Bis-(3,4,5,6-tetrachloro-1,2-dithiolate)-nickel tetrabutylammonium | 0.5 g |

A solution having the above composition was coated on this layer, and dried to obtain a light absorptive layer. Thus, there was obtained a recording medium (our product 37) of the type shown in FIG. 3. The reflectance and absorptance of this recording medium to 800 nm wavelength beam were 23% and 46% respectively.

When information of 0.5 MHz was recorded on the thus obtained recording medium from the substrate side using a semi-conductor laser emitting 790 nm wavelength beam under the conditions: radiation surface energy 4 mW and beam diameter 1.6 μm, there was formed a spot having a diameter of 0.9 μm by 16μ seconds' radiation (2.4 nJ/bit).

And, this recording medium exhibited the similar characteristics even after it had been stored for 1 month in the room light under the conditions: temperature 40° C. and humidity 90%.

Example 38

| | |
|---|---|
| Silver nitrate | 17.5 g |
| Water | 600 ml |
| Sodium hydroxide | 10 g |
| Polyvinyl alcohol | 5 g |
| Formamide | 20 ml |

Ammonia water was added to a solution having the above composition until said solution became transparent. The resulting solution was named A.

| | |
|---|---|
| Grape sugar | 45 g |
| Tartaric acid | 4 g |
| Alcohol | 100 ml |
| Water | 1000 ml |

A solution having the above composition was mixed with this solution A. An acrylic plate was dipped for 10 minutes in this mixed solution to thereby obtain a reflective layer formed of silver particles.

| | |
|---|---|
| Bis-(3,4,5,6-tetrabromo-1,2-dithiolate)-palladium cetyltriethylammonium | 1 g |
| Polyvinyl butyral | 2 g |
| Isopropyl alcohol | 10 g |

A solution having the above composition was further coated on said reflective layer by rotation-coating method and dried at 60° C. to obtain an about 0.4 μm-thick light absorptive layer. Thus, there was prepared a recording medium (our product 38) of the type shown in FIG. 3.

The reflectance and absorptance of this recording medium to 800 nm wavelength beam were 37% and 40% respectively.

When information was recorded on the thus obtained recording medium according to the same procedure as Example 37, there was formed a spot having a diameter of 1.2 μm by 0.8μ seconds' radiation (32 nJ/bit).

And, the characteristics of this recording medium did not change even after it had been stored for 1 month in the room light under the conditions: temperature 40° C. and humidity 90%.

Example 39

Bis-(3,6-diethyl-1,2-dithiolate)-nickeltetrabutylammonium was vapordeposited on the reflective layer formed of silver particles obtained by the same procedure as Example 37 to obtain an about 0.1 μm-thick light absorptive layer. Thus, there was prepared a recording medium (our product 39) of the type shown in FIG. 3. The reflectance and absorptance of this recording medium to 800 nm wavelength beam were 27% and 48% respectively.

When information was recorded on the thus obtained recording medium according to the same procedure as Example 7, there was formed a spot having a diameter of 1.2 μm by 0.7μ seconds' radition (28 nJ/bit).

The characteristics of this recording medium did not change even when it had been stored for 1 month in the room light under the conditions: temperature 40° C. and humidity 90%.

Example 40

| | |
|---|---|
| Polyvinyl alcohol | 1 g |

-continued

| Water | 9 g |
| --- | --- |
| Silver nitrate | 2 g |
| 25% ammonia water | 3 ml |
| Formamide | 0.5 ml |
| Grape sugar | 1.5 g |

A solution having the above composition was coated on an acrylic plate by rotation-coating method, and the same was heated at 60° C. for 5 minutes and then washed with water to obtain a reflective layer formed of silver particles.

| Polyvinyl alcohol | 0.5 g |
| --- | --- |
| Water | 9 g |
| Sodium 1-amino-4-(4-phenylamino sulfonate)-6,7-dinitroanthraquinone | 0.2 g |

A solution having the above composition was further coated on this reflective layer and dried to obtain a light absorptive layer having a thickness of about 0.3 μm. Thus, there was prepared a recording medium (our product 40) of the type shown in FIG. 3. The reflectance and absorptance of this recording medium to 800 nm wavelength beam were 39% and 50% respectively.

When information of 0.5 MHz was recorded on the thus obtained recording medium from the substrate side using a semi-conductor laser emitting 790 nm wavelength beam under the conditions: radiation surface energy 4 mW and beam diameter 1.6 μm, there was formed a spot having a diameter of 0.9 μm by 0.7μ seconds' radiation (2.8 nJ/bit).

And, this recording medium, after having been stored for 1 month in the room light under the conditions: temperature 40° C. and humidity 90%, exhibited the similar characteristics.

Example 41

| Polyvinyl butyral | 15 g |
| --- | --- |
| Isopropanol | 20 ml |

A solution having the above composition was further coated on the recording medium prepared in Example 40 and dried at 60° C. to form an about 0.8 μm-thick overcoat thereon. Thus, there was prepared a recording medium (our product 41) of the type shown in FIG. 4.

When information was recorded on the thus obtained medium in the same manner as Example 40, there was formed a spot having a diameter of 1.2 μm by 0.85μ seconds' radiation (3.4 nJ/bit).

This recording medium showed no change in characteristics even it had been stored for 1 month in the room light under the conditions: temperature 40° C. and humidity 90%.

Example 42

| Polyvinyl alcohol | 1 g |
| --- | --- |
| Water | 10 g |
| 8,17-bis(4-sodium phenylamino sulfonate) indanthrene | 0.5 g |
| C.I. Acid Blue-83 (C.I. 42660) | 0.7 g |

A solution having the above composition was coated on the reflective layer formed of silver particles according to Example 40 by rotation-coating method and dried at 60° C. to obtain a light absorptive layer having a thickness of about 0.3 μm. Thus, there was prepared a recording medium (our product 42) of the type shown in FIG. 3.

The reflectance and absorptance of this recording medium to 800 nm wavelength beam were 30% and 61% respectively. And, the reflectance and absorptance thereof to 630 nm wavelength beam were 27% and 65% respectively.

When information was recorded on the thus prepared recording medium in the same manner as Example 40, there was formed a spot having a diameter of 1.1 μm by 0.7μ seconds' radiation (2.8 nJ/bit).

We claim:

1. An optical information recording medium comprising a substrate which is transparent to a high density energy beam and a recording layer superimposed on said substrate, said recording layer consisting of a reflective layer located on the side of said recording layer that is closest to said substrate and a light absorptive layer formed on said reflective layer and located on the side of said recording layer that is remote from said substrate, said reflective layer containing closely distributed therein metal particles having a particle diameter of 1500 Angstroms or less and wherein said metal particles occupy from 60 to 98% of the area of the surface of said reflective layer, said light absorptive layer containing a dye or oil-soluble color capable of absorbing radiation of the wavelength range used to record information on the recording medium.

2. A recording medium according to claim 1 wherein said substrate is composed of polysulfone or polyimide.

3. A recording medium according to claim 1 wherein said reflective layer contains a dye or oil-soluble color.

4. A recording medium according to claim 1 wherein between said reflective layer and said substrate is interposed an undercoat that is capable of permeating a high density energy beam, does not react with the reflective layer, is superior in film forming ability and is of reduced thermal conductivity.

5. An optical information recording medium comprising a substrate and a recording layer superimposed on said substrate, said recording layer consisting of a pair of reflective layers and a light absorptive layer disposed between said reflective layers, said reflective layers each containing closely distributed therein metal particles having a particle diameter of 1500 Angstroms or less and wherein said metal particles occupy from 60 to 98% of the area of the surface of said reflective layers, said light absorptive layer containing a dye or oil-soluble color capable of absorbing radiation of the wavelength range used to record information on said recording medium.

6. A recording medium according to claim 5 wherein an overcoat is further superimposed on said reflective layer located on the side of said recording layer that is remote from said substrate.

7. A recording medium according to claim 5 wherein an undercoat is interposed between said substrate and said reflective layer located on the side of said recording layer that is closest to said substrate.

8. A recording medium according to claim 1 in which said light absorptive layer consists of a first light absorptive sub-layer located adjacent to said reflective layer and a second light absorptive sub-layer formed on said first light absorptive sub-layer and located remote from said reflective layer, said second light absorptive sub-layer containing said dye or oil-soluble color.

9. A recording medium according to claim 8 in which said first light absorptive sub-layer consists essentially of a binder resin containing particles of metal compound and a very small amount of metal substantially uniformly dispersed therein, said particles of metal compound and metal in said first light absorptive sub-layer having a particle size in the range of from 200 to 2000 Angstroms, the sum of the amounts of said particles of metal compound and metal in said first light absorptive sub-layer being in the range of from 1 to 30 volume %, based on the volume of said first light absorptive sub-layer.

10. A recording medium according to claim 8 wherein said reflective layer contains a dye or oil-soluble color.

11. A recording medium according to claim 8 wherein between said reflective layer and said said substrate is interposed an undercoat that is capable of permeating a high density energy beam, does not react with the reflective layer, is superior in film forming ability and is of reduced thermal conductivity.

12. A recording medium according to claim 1 wherein said reflective layer consists of said metal particles alone.

13. A recording medium according to claim 1 wherein the light absorptive layer consists of a dye or oil-soluble color.

14. A recording medium according to claim 1 wherein the light reflectance of said reflective layer to near infrared radiation is in the range of 15–75%.

15. A recording medium according to claim 1 wherein the light permeability of said light absorptive layer to near infrared radiation is 10% or less.

16. A recording medium according to claim 8 in which said second light absorptive sub-layer consists of a dye or oil-soluble color.

* * * * *